US012683078B2

(12) United States Patent
Yun et al.

(10) Patent No.: US 12,683,078 B2
(45) Date of Patent: Jul. 14, 2026

(54) MULTILAYER ELECTRONIC COMPONENT WITH IMPROVED COVER AND MARGIN PORTIONS

(71) Applicant: SAMSUNG ELECTRO-MECHANICS CO., LTD., Suwon-si (KR)

(72) Inventors: Han Sol Yun, Suwon-si (KR); Sung Chul Bae, Suwon-si (KR); Ji Hyun Yu, Suwon-si (KR); Sung Hyung Kang, Suwon-si (KR); Hye Won Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 177 days.

(21) Appl. No.: 18/742,308

(22) Filed: Jun. 13, 2024

(65) Prior Publication Data

US 2025/0087423 A1 Mar. 13, 2025

(30) Foreign Application Priority Data

Sep. 7, 2023 (KR) ........................ 10-2023-0119219

(51) Int. Cl.
*H01G 4/224* (2006.01)
*H01G 4/30* (2006.01)
*H01G 4/012* (2006.01)

(52) U.S. Cl.
CPC .............. *H01G 4/224* (2013.01); *H01G 4/30* (2013.01); *H01G 4/012* (2013.01)

(58) Field of Classification Search
None
See application file for complete search history.

(56) References Cited

U.S. PATENT DOCUMENTS 6,051,796 A 4/2000 Kuhl et al.
10,304,629 B2 5/2019 Kitamura et al.
(Continued)

FOREIGN PATENT DOCUMENTS

BR 9508451 A 12/1997
KR 10-2019-0121234 A 10/2019
(Continued)

OTHER PUBLICATIONS

Extended European Search Report dated Nov. 22, 2024 issued in the corresponding European Patent Application No. 24181966.3.

*Primary Examiner* — Eric W Thomas
(74) *Attorney, Agent, or Firm* — Morgan, Lewis & Bockius LLP

(57) ABSTRACT

A multilayer electronic component includes a body including a capacitance formation portion that is a region a dielectric layer and internal electrodes alternately arranged with the dielectric layer interposed therebetween in a first direction and including first and second surfaces opposing each other in the first direction, and external electrodes disposed on the body. The body further includes cover portions disposed on one side and the other surface of the capacitance formation portion in the first direction. A surface of one of the cover portions includes a flat portion forming the first surface or the second surface, a protrusion protruding from the first surface or the second surface in the first direction, and a recess portion concave from the first surface or the second surface in the first direction. One end of the protrusion is spaced apart from the recess portion and is disposed on the recess portion.

19 Claims, 5 Drawing Sheets

(56)     References Cited

U.S. PATENT DOCUMENTS

| | | | | |
|---|---|---|---|---|
| 2014/0182907 | A1* | 7/2014 | Lee | H01G 4/232 |
| | | | | 174/258 |
| 2020/0234884 | A1 | 7/2020 | Lee | |
| 2021/0057157 | A1 | 2/2021 | Lee et al. | |
| 2021/0082624 | A1* | 3/2021 | Kim | H01G 2/065 |
| 2021/0313113 | A1 | 10/2021 | Hirao | |
| 2021/0375546 | A1* | 12/2021 | Yang | H01G 4/30 |
| 2022/0076888 | A1* | 3/2022 | Kim | H01G 4/08 |
| 2024/0021347 | A1 | 1/2024 | Ooshima et al. | |

FOREIGN PATENT DOCUMENTS

| | | | |
|---|---|---|---|
| KR | 10-2021-0009747 | A | 1/2021 |
| KR | 10-2021-0023440 | A | 3/2021 |
| WO | 2022/264637 | A1 | 12/2022 |

* cited by examiner

100

FIRST
DIRECTION

SECOND
DIRECTION

I-I'

FIRST
DIRECTION

THIRD
DIRECTION

II-II'

☐ Conductive Materials
☒ Insulating Materials

MULTILAYER ELECTRONIC COMPONENT WITH IMPROVED COVER AND MARGIN PORTIONS

CROSS-REFERENCE TO RELATED APPLICATION(S)

This application claims benefit of priority to Korean Patent Application No. 10-2023-0119219 filed on Sep. 7, 2023 in the Korean Intellectual Property Office, the disclosure of which is incorporated herein by reference in its entirety.

TECHNICAL FIELD

The present disclosure relates to multilayer electronic components.

Multilayer ceramic capacitors (MLCCs), multilayer electronic components, are chip-type condensers mounted on the printed circuit boards of various electronic products including display devices, such as liquid crystal displays (LCDs) and plasma display panels (PDPs), computers, smartphones, cell phones, infotainment systems, and the like, to charge or discharge electricity.

Recently, with the expansion of the electric vehicle market, the use of high-voltage multilayer ceramic capacitors in circuits, such as an on-board charger (OBC) DC-DC converters of electric vehicles, has increased. When high voltages are applied to a multilayer ceramic capacitor, an electric field may be formed across a dielectric surface of a cover portion due to a charge charging phenomenon near an interface between external electrodes and the cover portion of the multilayer ceramic capacitor, which may cause an arc discharge phenomenon in the multilayer ceramic capacitor. The arc discharge phenomenon may cause damage to a surface of the multilayer ceramic capacitor and may be the main cause of reduced reliability.

Therefore, there is a need to improve the structure that may suppress arc discharge that may occur when high voltages are applied to the multilayer ceramic capacitor.

SUMMARY

An aspect of the present disclosure is to suppress an arc discharge that may occur when high voltages are applied to a multilayer ceramic capacitor.

Another aspect of the present disclosure is to solve a problem of reduced moisture resistance reliability that may occur when a shape of a surface of a cover portion is excessively controlled to suppress an arc discharge that may occur when high voltages re applied to a capacitor.

However, the purposes of the present disclosure are not limited to the above-described contents and may be more easily understood in the process of describing specific exemplary embodiments in the present disclosure.

According to an aspect of the present disclosure, a multilayer electronic component includes a body including a dielectric layer and internal electrodes alternately arranged with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction and external electrodes disposed on the third and fourth surfaces. The body includes a capacitance formation portion that is a region in which the dielectric layer and the internal electrodes are disposed to overlap each other in the first direction and cover portions disposed on one side and the other surface of the capacitance formation portion in the first direction. A surface of one of the cover portions includes a flat portion forming the first surface or the second surface, a protrusion protruding from the first surface or the second surface in the first direction, and a recess portion concave from the first surface or the second surface in the first direction. One end of the protrusion is spaced apart from the recess portion and is disposed on the recess portion.

According to an aspect of the present disclosure, a multilayer electronic component includes a body including a dielectric layer and internal electrodes alternately arranged with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; and external electrodes disposed on the third and fourth surfaces. The body includes a capacitance formation portion that is a region in which the dielectric layer and the internal electrodes are disposed to overlap each other in the first direction and margin portions disposed on one surface and the other surface of the capacitance formation portion in the third direction. A surface of one of the margin portions includes a flat portion forming the fifth surface or the sixth surface, a protrusion protruding from the fifth surface or the sixth surface in the third direction, and a recess portion concave from the fifth surface or the sixth surface in the third direction. One end of the protrusion is spaced apart from the recess portion and is disposed on the recess portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
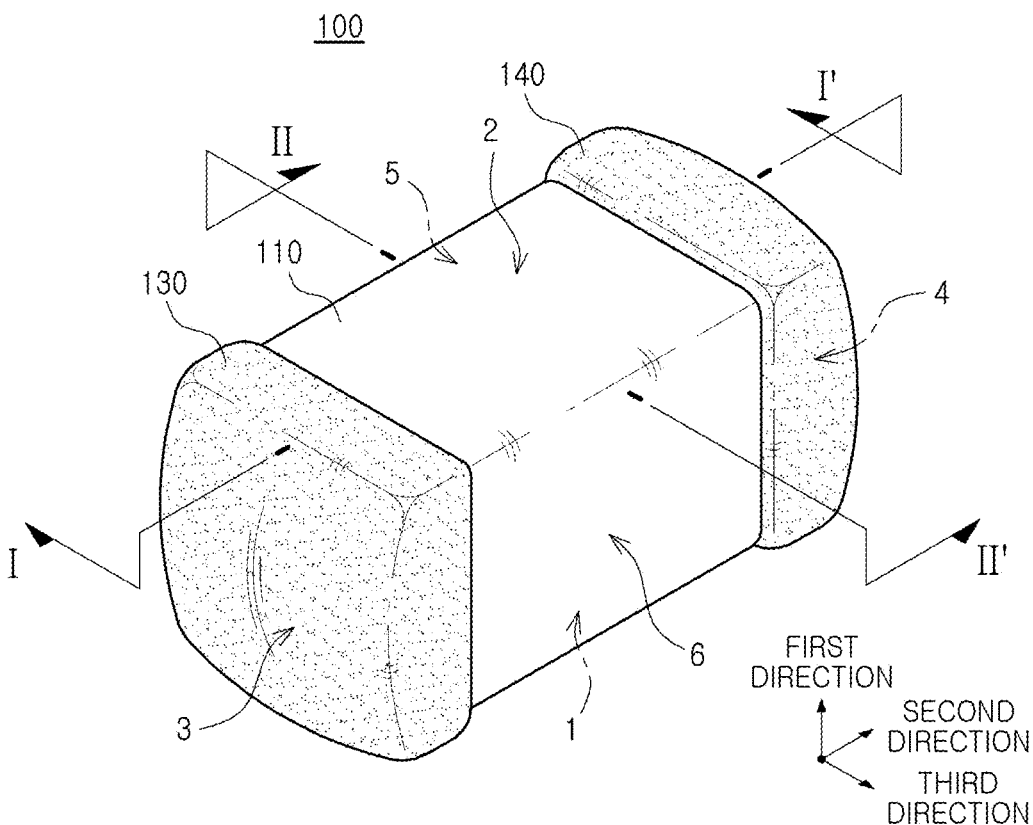
FIG. 1 is a perspective view schematically illustrating a multilayer electronic component according to an exemplary embodiment in the present disclosure.

Hereinafter, exemplary embodiments in the present disclosure will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations, such as "comprises" or "comprising", will be understood to imply the inclusion of stated elements but not the exclusion of any other elements.

In the drawing, a first direction is a direction in which first and second internal electrodes are alternately disposed with a dielectric layer interposed therebetween or a thickness (T) direction, and a second direction and a third direction are perpendicular to the first direction, in which the second direction may be defined as a length (L) direction and the third direction may be defined as a width (W) direction.

FIG. 1 is a perspective view schematically illustrating a multilayer electronic component according to an exemplary embodiment in the present disclosure.

Figure 2:
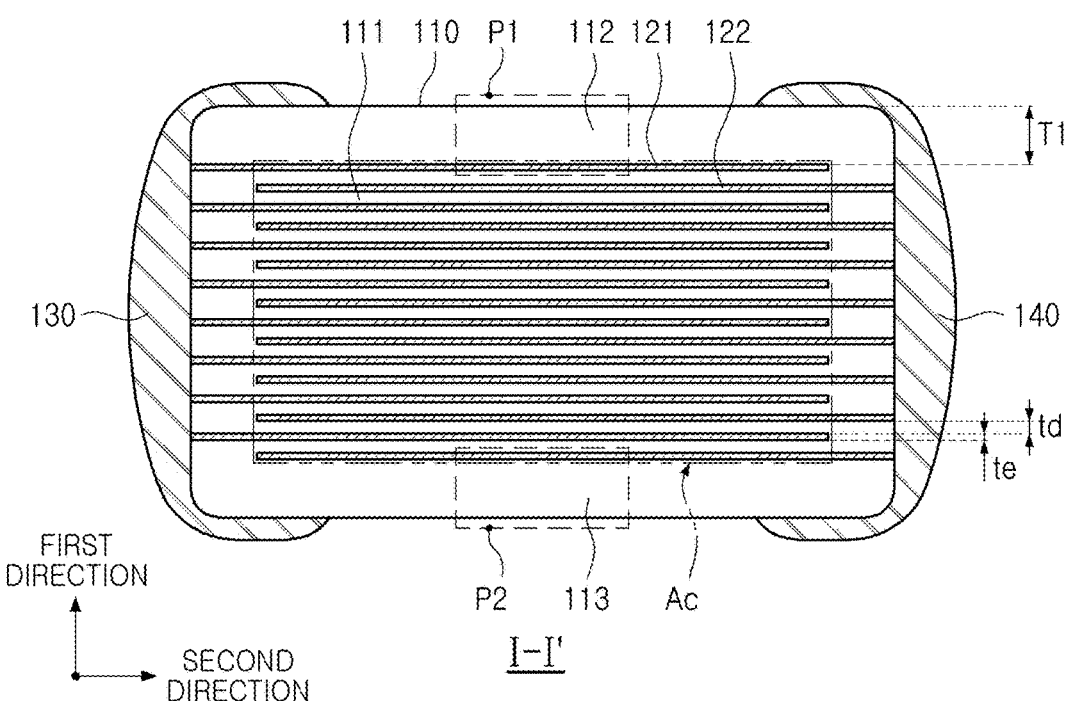
FIG. 2 is a cross-sectional view taken along line I-I' of FIG. 1.

FIG. 2 is a cross-sectional view taken along line I-I' of FIG. 1.

Figure 3:
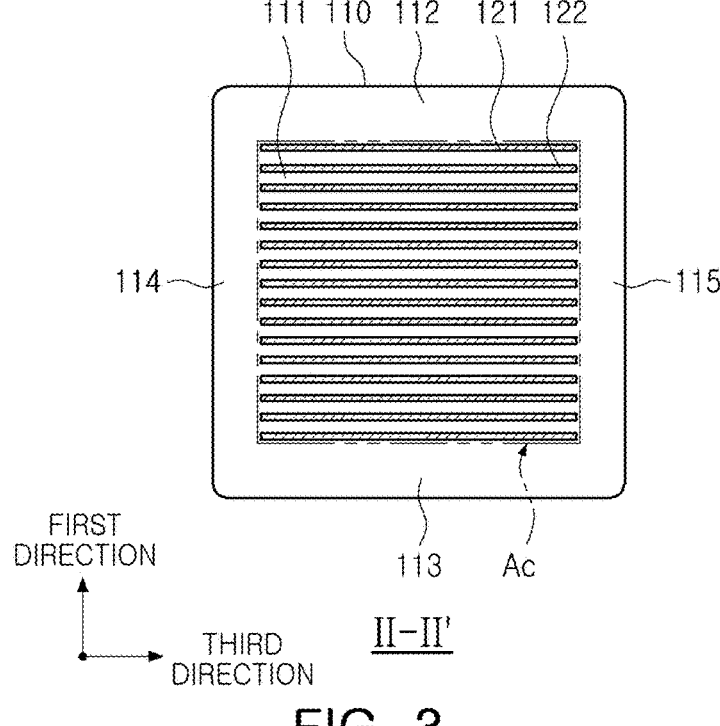
FIG. 3 is a cross-sectional view taken along line II-II' of FIG. 1.

FIG. 3 is a cross-sectional view taken along line II-II' of FIG. 1.

Figure 4:
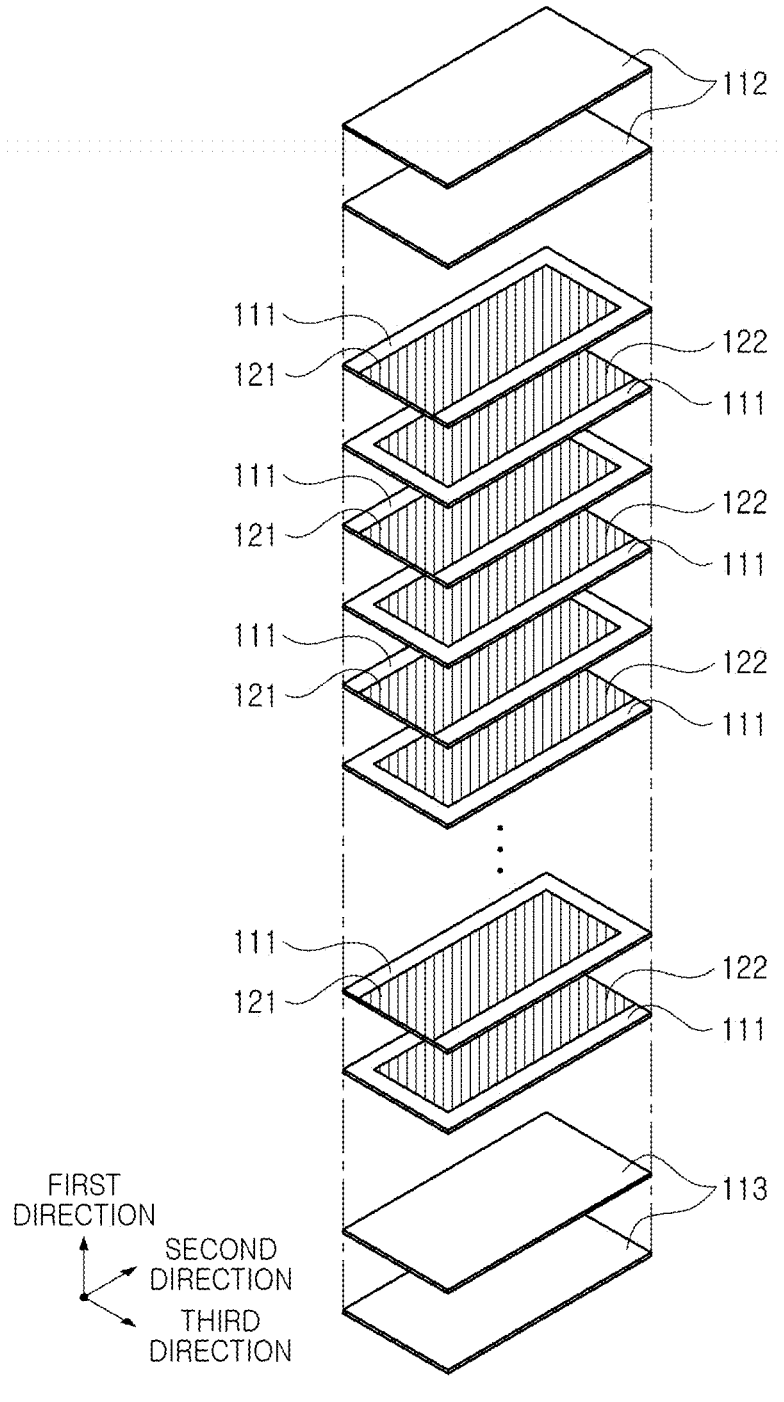
FIG. 4 is an exploded perspective view illustrating a shape of a body of a multilayer electronic component.

FIG. 4 is an exploded perspective view illustrating a shape of a body of a multilayer electronic component.

Figure 5:
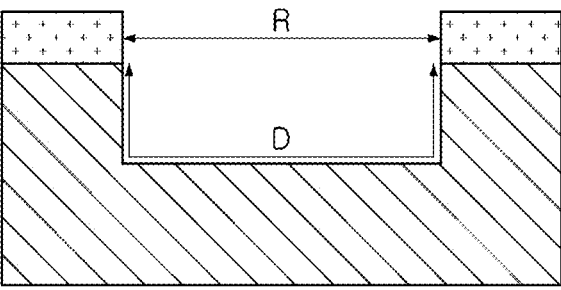
FIG. 5 is a schematic diagram illustrating a clearance and a creepage distance between a conductive material and an insulating material.

FIG. 5 is a schematic diagram illustrating a clearance and a creepage distance between a conductive material and an insulating material.

Figure 6:
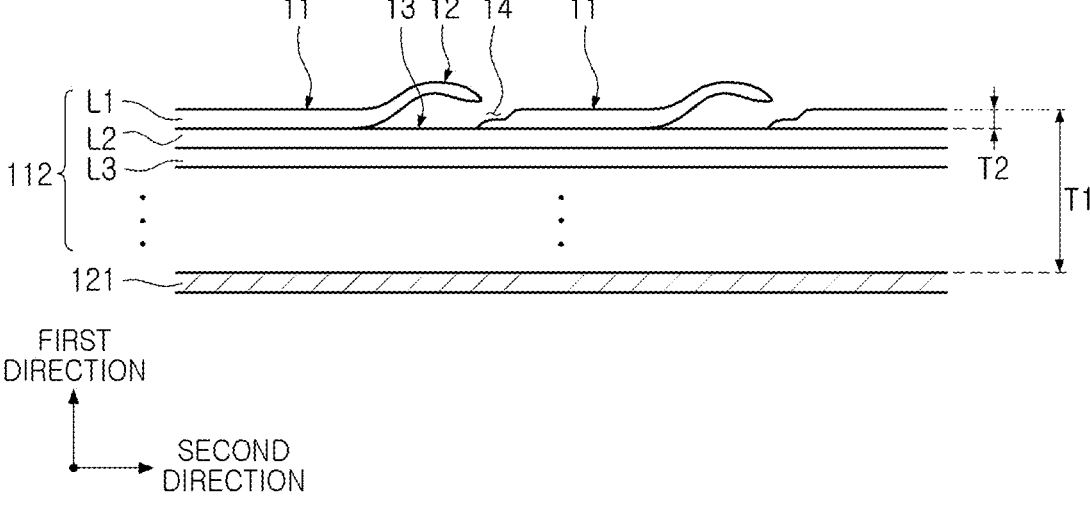
FIG. 6 is an enlarged schematic diagram illustrating surfaces of cover portions (regions P1 and P2 in FIG. 2) according to an exemplary embodiment.

FIG. 6 is an enlarged schematic diagram illustrating surfaces of cover portions (regions P1 and P2 in FIG. 2) according to an exemplary embodiment.

Hereinafter, a multilayer electronic component 100 according to an exemplary embodiment in the present disclosure and various exemplary embodiments thereof are described in detail with reference to FIGS. 1 to 6.

The multilayer electronic component 100 according to an exemplary embodiment in the present disclosure includes a body 110 including a dielectric layer 111 and internal electrodes 121 and 122 alternately arranged with the dielectric layer 111 interposed therebetween in a first direction and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; and external electrodes 130 and 140 disposed on the third and fourth surfaces. The body 110 includes a capacitance formation portion Ac that is a region in which the dielectric layer 111 and the internal electrodes 121 and 122 are disposed to overlap each other in the first direction and cover portions 112 and 113 disposed on one side and the other surface of the capacitance formation portion Ac in the first direction, a surface of the cover portion 112/113 includes a flat portion 11 forming the first surface 1 and the second surface 2, a protrusion 12 protruding from the first surface 1 or the second surface 2 in the first direction, and a recess portion 13 concave from the first surface 1 or the second surface 2 in the first direction, and one end of the protrusion 12 is spaced apart from the recess portion 13 and is disposed on the recess portion 13.

The body 110 includes the dielectric layer 111 and the internal electrodes 121 and 122 alternately disposed with the dielectric layer 111 therebetween in the first direction.

Although a specific shape of the body 110 is not particularly limited, as shown, the body 110 may have a hexahedral shape or a similar shape. Due to the shrinkage of ceramic powder included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM). There is no need to specifically limit the number of stacked dielectric layers, and the number of stacked dielectric layers may be determined considering the size of the ceramic electronic component. For example, the body may be formed by stacking 300 or more dielectric layers.

Raw materials forming the dielectric layer 111 may vary depending on purposes thereof. Specifically, ferroelectric $BaTiO_3$ may be used as a material for the main purpose of achieving high capacitance per unit volume, and paraelectric $CaZrO_3$ may be used as a material for the main purpose of improving reliability in a high temperature environment. $BaTiO_3$-based materials may include, for example, $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) in which calcium (Ca) or zirconium (Zr) is partially dissolved in $BaTiO_3$, and $CaZrO_3$-based materials may include, for example, $(Ca_{1-x}Sr_x)(Zr_{1-y}Ti_y)O_3$ ($0<x<1$, $0<y<1$).

In an exemplary embodiment, the dielectric layer 111 may be formed of a $CaZrO_3$-based material to improve high-temperature and high-voltage reliability of the multilayer electronic component 100. This may also be applied to the cover portions 112 and 113, which are described below. When the cover portions 112 and 113 are formed of a $CaZrO_3$-based material, hardness of the cover portions 112 and 113 may be improved. Accordingly, the structure of the flat portion 11, the protruding portion 12, and the recess portion 13 as in an exemplary embodiment in the present disclosure may be smoothly formed.

When the dielectric layer 111 is formed of a $CaZrO_3$-based material, the dielectric layer of the multilayer electronic component 100 may include Ca and Zr and may further include Sr and Ti.

An average thickness td of the dielectric layer 111 is not particularly limited.

For the purpose of miniaturization and high capacitance of the multilayer electronic component 100, the average thickness td of the dielectric layer 111 may be 0.35 μm or less, and to improve the reliability of the multilayer electronic component 100 under high temperature and high voltage, the average thickness of the dielectric layer 111 may be 3 μm or more.

The average thickness td of the dielectric layer 111 may refer to an average thickness of the dielectric layer 111 disposed between the first and second internal electrodes 121 and 122.

The average thickness td of the dielectric layer 111 may be measured by scanning an image of a cross-section (L-T cross-section) of the body 110 in the third-first (L-T) directions with a scanning electron microscope (SEM).

For example, the average thickness the of the dielectric layer 111 and 122 is measured as follows. In an image of a cross-section of the body 110 in length and thickness directions (L-T) taken at the center of the body 110 in the width direction scanned with a scanning electron microscope, a total of five dielectric layer 111 layers including two upper layers and two lower layers based on one dielectric layer at a point at which a central line of the body in the length direction and a central line of the body in the thickness direction meet are extracted among the dielectric layers, five points including two left points and two right points based on one reference point are then determined at equal intervals based on the point at which the central line of the body in the length direction and the central line of the body in the thickness direction meet, and thereafter, thicknesses at the respective points are measured and averaged.

As shown in FIG. 2, the internal electrodes 121 and 122 are alternately arranged with the dielectric layer 111 therebetween.

The internal electrodes 121 and 122 may include first and second internal electrodes 121 and 122. The first and second internal electrodes 121 and 122 may be alternately disposed to face each other with the dielectric layer 111 constituting the body 110 interposed therebetween and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and may be exposed through the fourth surface 4.

At this time, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may be formed by printing conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof.

A printing method of the conductive paste for internal electrodes may be a screen-printing method or a gravure printing method, but the present disclosure is not limited thereto.

An average thickness the of the internal electrodes 121 and 122 is not particularly limited and may vary depending on the purpose. In order to miniaturize the multilayer electronic component 100, the average thickness the of the internal electrodes 121 and 122 may be 0.35 μm or less, and in order to improve the reliability of the multilayer electronic component 100 under high temperature and high voltage, the average thickness the of the internal electrodes 121 and 122 may be 2 μm or more.

The average thickness the of the internal electrodes 121 and 122 is obtained as follows. In an image of a cross-section of the body 110 in length and thickness directions (L-T) taken at the center of the body 110 in the width direction scanned with a scanning electron microscope, a total of five internal electrode layers including two upper layers and two lower layers based on one internal electrode layer at a point at which a central line of the body in the length direction and a central line of the body in the thickness direction meet are extracted among the internal electrode layers, five points including two left points and two right points based on one reference point are then determined at equal intervals based on the point at which the central line of the body in the length direction and the central line of the body in the thickness direction meet, and thereafter, thicknesses at the respective points are measured and averaged.

Meanwhile, to improve the reliability of the multilayer electronic component 100 in a high-temperature and high-voltage environment, the average thickness td of the dielectric layer and the average thickness of the internal electrode the may satisfy td>te×2.

The body 110 may include a capacitance formation portion Ac, which is a region in which the dielectric layer 111 and the internal electrodes 121 and 122 overlap in the first direction.

In addition, the capacitance formation portion Ac is a portion contributing to forming capacitance of the capacitor and may be formed by repeatedly stacking a plurality of first and second internal electrodes 121 and 122 with the dielectric layer 111 interposed therebetween.

Referring to FIGS. 2 and 3, cover portions 112 and 113 may be disposed on one side and the other side of the capacitance formation portion Ac in the first direction.

The cover portions 112 and 113 may serve to prevent damage to the internal electrodes due to physical or chemical stress and may serve to improve the strength of the multilayer electronic component 100.

The cover portions 112 and 113 do not include internal electrodes, may include the same material as that of the dielectric layer 111, and may be formed by stacking a single dielectric layer or two or more dielectric layers on upper and lower surfaces of the capacitance formation portion Ac in the thickness direction.

Specific shapes of the cover portions 112 and 113 are described below.

Referring to FIG. 3, margin portions 114 and 115 may be disposed on one surface and the other surface of the capacitance formation portion Ac in the third direction.

The margin portions 114 and 115 include a margin portion 114 disposed on the sixth surface 6 of the body 110 and a margin portion 115 disposed on the fifth surface 5 of the body 110. That is, the margin portions 114 and 115 may be disposed on both sides of the ceramic body 110 in the width direction.

As shown in FIG. 3, the margin portions 114 and 115 may refer to a region between both ends of the first and second internal electrodes 121 and 122 and the boundaries of the body 110 in a cross-section of the body 110 taken in the width-thickness (W-T) direction.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance formation portion Ac in the third direction (the width direction).

Meanwhile, the widths of the margin portions 114 and 115 may not be particularly limited. However, an average width of the margin portions 114 and 115 may be 15 μm or less in order to more easily achieve miniaturization and high capacitance of the multilayer electronic component.

The average width of the margin portions 114 and 115 may refer to an average size of the margin portions 114 and 115 in the third direction and may be a value obtained by averaging sizes of the margin portions 114 and 115 measured at five equally spaced points on the side surface of the capacitance formation portion Ac.

Referring to FIGS. 1 and 2, the external electrodes 130 and 140 are disposed on the body 110.

The external electrodes 130 and 140 are disposed on the body 110 and connected to the internal electrodes 121 and 122.

As shown in FIG. 2, the first and second external electrodes 130 and 140 may be disposed on the third and fourth surfaces 3 and 4 of the body 110 and connected to the first and second internal electrodes 121 and 122, respectively.

In the present exemplary embodiment, although a structure in which the ceramic electronic component 100 has two external electrodes 130 and 140 is described, the number and shape of the external electrodes 130 and 140 may be determined depending on the shape of the internal electrodes 121 and 122 or other purposes.

Meanwhile, the external electrodes 130 and 140 may be formed using any material having electrical conductivity, such as metal, and a specific material may be determined considering electrical characteristics, structural stability, etc., and the external electrodes 130 and 140 may further have a multilayer structure.

For example, the external electrodes 130 and 140 may include an electrode layer disposed on the body 110 and a plating layer formed on the electrode layer.

For a more specific example of the electrode layer, the electrode layer may be a sintered electrode including a conductive metal and glass or a resin-based electrode including a conductive metal and resin.

In addition, the electrode layer may be in the form of a fired electrode and a resin-based electrode sequentially formed on the body 110. In addition, the electrode layer may be formed by transferring a sheet including a conductive metal onto the body 110 or may be formed by transferring a sheet including a conductive metal onto a sintered electrode.

As the conductive metal included in the electrode layer, any material having excellent electrical conductivity may be used and is not particularly limited. For example, conductive metals may include one or more of nickel (Ni), copper (Cu), palladium (Pd), silver (Ag), gold (Au), platinum (Pt), tin (Sn), tungsten (W), titanium (Ti), or alloys thereof.

The plating layer may be a plating layer including one or more of nickel (Ni), tin (Sn), palladium (Pd), and alloys thereof and may be formed of a plurality of layers.

Specifically, for example, the plating layer may be a Ni plating layer or a Sn plating layer, and may be a form in which a Ni plating layer and a Sn plating layer are formed sequentially on an electrode layer and a form in which a Sn plating layer, a Ni plating layer, and a Sn plating layer are formed sequentially. In addition, the plating layer may include a plurality of Ni plating layers and/or a plurality of Sn plating layers.

The size of the multilayer electronic component 100 is not particularly limited.

In order to achieve both miniaturization and high capacitance, the multilayer electronic component 100 may have a size of 0201 (length×width: 0.2 mm×0.1 mm) or less, and for products for which reliability in high temperature and high voltage environments is important, the multilayer electronic component 100 may have a size of 3216 (length×width: 3.2 mm×1.6 mm) or greater, but is not limited thereto.

Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

FIG. 5 is a schematic diagram illustrating a clearance and a creepage distance between a conductive material and an insulating material.

Referring to FIG. 5, a conductive material is disposed on an insulating material. Here, the conductive material may refer to the external electrode of the multilayer electronic component, and the insulating material may refer to the cover portion. A distance indicated by R refers to the clearance, which is the shortest distance across space between the conductive materials, and a distance indicated by D refers to the creepage distance, which is the shortest distance along a surface of the insulating material between conductive materials.

In the present disclosure, a moving distance of charges is increased by increasing the creepage distance, and thereby suppressing an arc discharge phenomenon to improve the reliability of the multilayer electronic component 100.

Hereinafter, the shape of the surfaces of the cover portions 112 and 113 to increase the creepage distance is described in detail.

Meanwhile, the following description is given based on the cover portion 112 disposed on one surface of the capacitance formation portion Ac in the first direction, among the cover portions 112 and 113, but the shape of the surface of the cover portion may also be equally applied to the cover portion 113 disposed on the other surface of the capacitance formation portion Ac in the first direction.

The surface of the cover portion of the related art multilayer electronic component may have a flat shape, have a plurality of holes, or have a shape with roughness in which concave and convex shapes are repeated. When the surface of the cover portion has a flat shape, it may be difficult to increase the creepage distance, and even in the case of having the shape with multiple holes or roughness, a hopping conduction may occur due to insufficient discontinuity in the portions with the holes or roughness in situations in which high voltages are applied to the multilayer electronic component, and as a result, the effect of suppressing the arc discharge phenomenon under high voltages may not be sufficient. That is, even if the surface of the cover portion has multiple holes or has a shape with roughness, there is a possibility that sufficient discontinuity is not provided to increase the creepage distance.

Accordingly, in an exemplary embodiment in the present disclosure, an arc discharge phenomenon that may occur in a multilayer electronic component in high voltage environment is suppressed by providing sufficient discontinuity to the surface of the cover portion to increase the creepage distance.

Referring to FIG. 6, the surface of the cover portion 112 according to an exemplary embodiment in the present disclosure may include a flat portion 11 forming a first surface and a second surface, a protrusion 12 protruding from the first surface 1 or the second surface 2 in the first direction, and a recess portion 13 concave from the first surface 1 or the second surface 2 in the first direction. At this time, one end of the protrusion 12 may be spaced apart from the recess portion 13 and disposed above the recess portion 13.

The flat portion 11 may refer to a region having a flat shape in the outermost surface of the cover portion 112 and may refer to a region forming the first or second surfaces 1 or 2 of the body 110.

Meanwhile, the flat portion 11 may form a curved surface due to shrinkage during a manufacturing process. Also, in this case, the protrusion 12 corresponds to a region disposed above the recess portion 13 and may therefore be distinguished from the flat portion 11.

The protrusion 12 may protrude from the first or second surface in the first direction, and the recess portion 13 may be concave from the first or second surface in the first direction. The recess portion 13 may refer to a region lacking a portion of dielectric layers L1, L2, and L3 of the cover portion 112, and the protrusion 12 may refer to a region in which the region lacking the portion of the dielectric layers L1, L2, and L3 protrudes in the first direction.

Here, one end of the protrusion 12 may be disposed to be spaced apart from the recess portion 13, and one end of the protrusion 12 may be disposed above the recess portion 13. Through this structure, it is possible to provide discontinuity to the surface of the cover portion 112 enough to sufficiently increase the creepage distance along the surface of the cover portion 112, and thus, the occurrence of an arc discharge phenomenon may be suppressed even when high voltages are applied to the multilayer electronic component 100.

Meanwhile, the structure of the surface of the cover portion 112 described above may be equally applied to the cover portion 113. However, in an exemplary embodiment, the number of protrusions 12 disposed on the surface of the cover portion 112 disposed on one surface of the capacitance formation portion Ac in the first direction may be different from the number of protrusions 12 disposed on the surface of the cover portion disposed on the other surface of the capacitance formation portion Ac in the first direction.

Meanwhile, as described above, the cover portion 112 may be formed by stacking a single dielectric layer or two or more dielectric layers on each of the upper and lower surfaces of the capacitance formation portion Ac in the thickness direction (first direction), and thus, the cover portion 112 may include one or more dielectric layers L1, L2, and L3. In FIG. 6, the dielectric layers of the cover portion are indicated as L1, L2, and L3 to distinguish them from the dielectric layer 111 included in the capacitance formation portion Ac.

Meanwhile, in an exemplary embodiment, a cutoff portion 14 may be disposed between one end of the protrusion 12 and the flat portion 11 that is not connected to the protrusion 12. As a result, some of the dielectric layers constituting the cover portion 112 may have a discontinuous shape when viewed in cross-section in the first and second directions, and as a result, the creepage distance along the surface of the cover portion 112 may be further increased, and the arc discharge suppression effect may become more remarkable.

Meanwhile, in an exemplary embodiment, the surface of the cover portion adjacent to the cutoff portion 14 may have a step shape. An example of forming this structure may be a case in which the protrusion 12 is formed by peeling off a portion of the dielectric layers L1, L2, and L3 constituting the cover portion 112, but is not limited thereto.

Meanwhile, as in an exemplary embodiment in the present disclosure, the surface of the cover portion 112 may include the flat portion 11 forming the first and second surfaces, the protrusion 12 protruding from the first or second side in the first direction, and the recess portion 13 that is concave from the first 1 or second surface 2 in the first direction. At this time, in the structure in which one end of the protrusion 12 is spaced apart from the recess portion 13 and disposed above the recess portion 13, if the protrusion 12 and the recess portion 13 are formed excessively large in the first direction, an effective thickness of the cover portion 112 may be significantly reduced, which may reduce the reliability of the multilayer electronic component 100.

Specifically, when an average size in the first direction from the end in the first direction of the internal electrode 121 disposed on the outermost side of the capacitance formation portion in the first direction to the flat portion 11 is T1 and an average size in the first direction from the lowermost point of the recess portion 13 in the first direction to the flat portion 11 is T2, if T2/T1 exceeds 0.20, the thickness of the cover portion excluding the protrusion 12 may be significantly reduced, thereby reducing the moisture resistance reliability of the multilayer electronic component 100. Therefore, it is preferable that T2/T1 is 0.20 or less.

Meanwhile, if T2/T1 is less than 0.01, sufficient discontinuity cannot be provided to the surface of the cover portion 112, and thus, the phenomenon of suppressing arc discharge of the multilayer electronic component 100 may not be sufficient. Therefore, it is preferable that T2/T1 is 0.01 or more.

That is, in an exemplary embodiment, by setting T2/T1 to satisfy 0.01 or more and 0.20, the arc discharge phenomenon of the multilayer electronic component 100 may be suppressed and deterioration of the moisture resistance reliability may be suppressed.

In an exemplary embodiment, when the average size in the first direction from the end of the internal electrode 121 in the first direction disposed on the outermost side of the capacitance formation portion Ac in the first direction to the flat portion 11 is T1, T1 may satisfy 150 μm or more and 500 μm or less, but is not limited thereto.

Figures 7, 8:
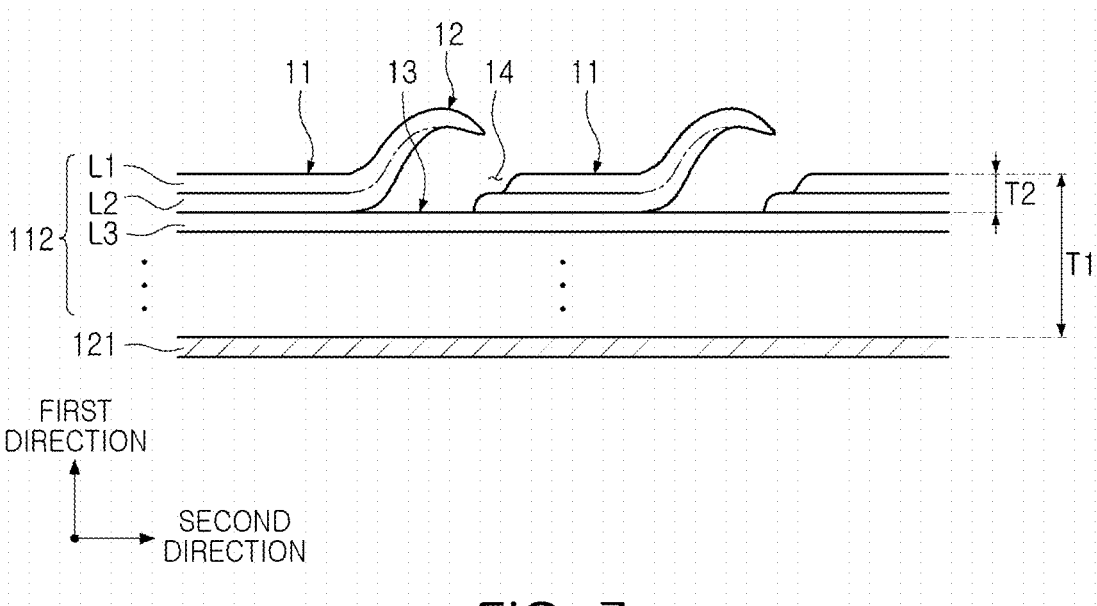
FIG. 7 is a schematic diagram illustrating a modified example of FIG. 6.
FIG. 8 is a schematic diagram illustrating a modified example of FIG. 6.

FIG. 7 is a schematic diagram illustrating a modified example of FIG. 6.

Referring to FIG. 7, the protrusion 12 according to the modified example may include one or more dielectric layers L1 and L2. Accordingly, the recess portion 13 may refer to a region lacking one or more dielectric layers L1 and L2.

In the case of having the structure forming the protrusion 12 including one or more dielectric layers L1 and L2 according to the modified example, the creepage distance along the surface of the cover portion 112 may be further increased and the arc discharge suppression effect may become more remarkable. Accordingly, the arc discharge suppression effect of the multilayer electronic component 100 may become more remarkable.

FIG. 8 is a schematic diagram illustrating a modified example of FIG. 6.

Referring to FIG. 8, the protrusion 12 according to the modified example may have a zigzag shape. The zigzag shape of the protrusion 12 may be a shape including a plurality of concave portions and convex portions. The concave portion and the convex portion may be arranged alternately, but are not limited thereto, and the protrusion 12 may have a shape in which the concave portion and the convex portion are irregularly arranged.

When the protrusion 12 has a zigzag shape according to the modified example, the creepage distance along the surface of the cover portion 112 may be further increased and the arc discharge suppression effect may be more remarkable. Accordingly, the arc discharge suppression effect of the multilayer electronic component 100 may become more remarkable.

The surface structure of the aforementioned cover portions 112 and 113 may also be applied to the surfaces of the margin portions 114 and 115. Specifically, in an exemplary embodiment, the surfaces of the margin portions 114 and 115 may include a flat portion forming the fifth and sixth surfaces 5 and 6, a protrusion protruding from the fifth surface or the sixth surface in the third direction, and a recess portion concave from the fifth surface 5 or the sixth surface 6 in the third direction. When the margin portions 114 and 115 have this surface structure, the arc discharge phenomenon may be suppressed even when the external electrodes are formed to cover a portion of the margin portions.

Experimental Example

Table 1 illustrates the results of arc discharge evaluation and moisture resistance reliability evaluation for samples of multilayer electronic components manufactured with different T2/T1.

For the electronic component samples, a ceramic sheet was produced by adding other auxiliary components to main binder added to the ceramic sheet forming the cover and performing wet polishing. However, the present disclosure is not limited thereto, and peeling of the surface of the cover portion may be controlled using various methods.

Arc discharge evaluation was conducted using the Chroma HIPOT Tester under the conditions of continuously applying a DC voltage of 0 to 5 kV and ramp input for 12.5 seconds. A case in which a break down occurred at a voltage lower than a normal BDV without arc discharge was determined to be NG.

In the case of moisture resistance reliability evaluation, a sample in which an insulation resistance value decreased by 10% or less, compared to an initial value, under the conditions that humidity was 85%, temperature was 85° C., voltage was 630 V, and time was 48 hours was determined to be NG.

Meanwhile, the arc discharge evaluation was conducted on 10 samples, the moisture resistance reliability evaluation was conducted on 320 samples, and the values of T2/T1 were randomly calculated from 10 samples in a lot of multilayer electronic components manufactured by varying the degree of polymerization of the binder added to the ceramic sheet and an average value thereof was obtained. Meanwhile, Example 1 corresponds to a 3216-size multilayer electronic component with a rated voltage of 630 V class, and Example 2 corresponds to a 3225 size with a rated voltage of 630 V class.

As for the T2/T1 value, a mold was manufactured by mounting the multilayer electronic component in the length-thickness direction and polished to the center in the width direction, and the T1 and T2 values were measured with a scanning electron microscope (SEM), and the ratio thereof was identified. At this time, as the T1 and T2 values, values measured at three or more points at equal intervals in the longitudinal direction were taken.

TABLE 1

| | Example 1 | | Example 2 | |
|---|---|---|---|---|
| T2/T1 | Evaluation of arc discharge (NG %) | Evaluation of moisture resistance reliability (NG %) | Evaluation of arc discharge (NG %) | Evaluation of moisture resistance reliability (NG %) |
| <0.01 | 4% | 1% | 5% | 2% |
| 0.01 | 0% | 0% | 0% | 0% |
| 0.05 | 0% | 0% | 0% | 0% |
| 0.1 | 0% | 0% | 0% | 0% |
| 0.2 | 0% | 0% | 0% | 0% |
| 0.25 | 0% | 2% | 0% | 2% |
| 0.3 | 0% | 4% | 0% | 7% | component powder of a CSZT-based base material, mixing the same with a dispersant using ethanol and toluene as a solvent, and then mixing the same with a binder. An Ni electrode was printed and stacked on the formed ceramic sheet and compressed and cut to form a chip, the cut chip was calcined to remove the binder, sintered in a reducing atmosphere, and then subjected to a termination process and electrode firing with copper (Cu) paste to complete the multilayer electronic components 100.

Meanwhile, the strength of the surface of the cover portion varies depending on the degree of polymerization of the binder added to the ceramic sheet. When wet polishing is performed on cover portions with different strengths, a peeling pattern of a portion of the cover portion also changes, and the value of T2/T1 may be adjusted accordingly. In this experimental example, the value of T2/T1 was adjusted by varying the degree of polymerization of the Referring to Table 1, it can be seen that, in both Examples 1 and 2, when T2/T1 is 0.01 or more and 0.2 or less, the NG ratio is 0% in both arc discharge evaluation and moisture resistance reliability evaluation, and it can be seen that, when T2/T1 is less than 0.01, a short circuit occurs due to arc discharge, and when T2/T1 exceeds 0.2, moisture resistance reliability deteriorates.

Therefore, regardless of the size of the multilayer electronic component, when T2/T1 is 0.01 or more and 0.2 or less, a short circuit due to arc discharge may be prevented and moisture resistance reliability may be improved.

One of the various effects of the present disclosure is to suppress the arc discharge phenomenon that may occur when high voltages are applied to a multilayer electronic component by increasing the creepage distance by controlling a fine shape of the surface of the cover portion.

One of the various effects of the present disclosure is to suppress arc discharge phenomenon that may occur when high voltages are applied to a multilayer electronic component and at the same time to prevent a deterioration in moisture resistance reliability by controlling a fine shape of the surface of the cover portion.

While example exemplary embodiments have been shown and described above, it will be apparent to those skilled in the art that modified examples and variations could be made without departing from the scope of the present disclosure as defined by the appended claims.

What is claimed is:

1. A multilayer electronic component comprising:
a body including a dielectric layer and internal electrodes alternately arranged with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
external electrodes disposed on the third and fourth surfaces,
wherein the body includes a capacitance formation portion that is a region in which the dielectric layer and the internal electrodes are disposed to overlap each other in the first direction and cover portions disposed on one side and the other surface of the capacitance formation portion in the first direction,
a surface of one of the cover portions includes a flat portion forming the first surface or the second surface, a protrusion protruding from the first surface or the second surface in the first direction, and a recess portion concave from the first surface or the second surface in the first direction, and
one end of the protrusion is spaced apart from the recess portion and is disposed above the recess portion.

2. The multilayer electronic component of claim 1, wherein T2/T1 satisfies 0.01 or more and 0.20 or less, in which T1 is an average size in the first direction from an end of in the first direction of the internal electrode disposed on an outermost side of the capacitance formation portion in the first direction to the flat portion and T2 is an average size in the first direction from a lowermost point of the recess portion in the first direction to the flat portion.

3. The multilayer electronic component of claim 1, wherein a cutoff portion is disposed between one end of the protrusion and the flat portion.

4. The multilayer electronic component of claim 3, wherein a surface of the one of the cover portions adjacent to the cutoff portion has a step shape.

5. The multilayer electronic component of claim 1, wherein the protrusion includes one or more dielectric layers.

6. The multilayer electronic component of claim 1, wherein the protrusion has a zigzag shape.

7. The multilayer electronic component of claim 1, wherein a number of protrusions disposed on the surface of the one of the cover portions disposed on one surface of the capacitance formation portion in the first direction is different from a number of protrusions disposed on a surface of another of the cover portions disposed on the other surface of the capacitance formation portion in the first direction.

8. The multilayer electronic component of claim 1, wherein the body further includes margin portions disposed on one surface and the other surface of the capacitance formation portion in the third direction, and a surface of one of the margin portions includes a flat portion forming the fifth surface or the sixth surface, a protrusion protruding from the fifth surface or the sixth surface in the third direction, and a recess portion concave from the fifth surface or the sixth surface in the third direction.

9. The multilayer electronic component of claim 1, wherein T1 satisfies 150 $\mu$m or more and 500 $\mu$m or less, in which T1 is an average size in the first direction from an end of in the first direction of the internal electrode disposed on an outermost side of the capacitance formation portion in the first direction to the flat portion.

10. The multilayer electronic component of claim 1, wherein td satisfies 3 $\mu$m or more, in which td is an average thickness of the dielectric layer.

11. The multilayer electronic component of claim 1, wherein td>te×2 is satisfied, in which td is an average thickness of the dielectric layer and te is an average thickness of the internal electrode.

12. The multilayer electronic component of claim 1, wherein the dielectric layer includes calcium (Ca), strontium (Sr), zirconium (Zr), and titanium (Ti).

13. A multilayer electronic component comprising:
a body including a dielectric layer and internal electrodes alternately arranged with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
external electrodes disposed on the third and fourth surfaces,
wherein the body includes a capacitance formation portion that is a region in which the dielectric layer and the internal electrodes are disposed to overlap each other in the first direction and margin portions disposed on one surface and the other surface of the capacitance formation portion in the third direction,
a surface of one of the margin portions includes a flat portion forming the fifth surface or the sixth surface, a protrusion protruding from the fifth surface or the sixth surface in the third direction, and a recess portion concave from the fifth surface or the sixth surface in the third direction, and
one end of the protrusion is spaced apart from the recess portion and is disposed above the recess portion.

14. The multilayer electronic component of claim 13, wherein a cutoff portion is disposed between one end of the protrusion and the flat portion.

15. The multilayer electronic component of claim 14, wherein a surface of the one of the margin portions adjacent to the cutoff portion has a step shape.

16. The multilayer electronic component of claim 13, wherein the protrusion has a zigzag shape.

17. The multilayer electronic component of claim 13, wherein td satisfies 3 $\mu$m or more, in which td is an average thickness of the dielectric layer.

18. The multilayer electronic component of claim 13, wherein td>te×2 is satisfied, in which td is an average thickness of the dielectric layer and te is an average thickness of the internal electrode.

19. The multilayer electronic component of claim 13, wherein the dielectric layer includes calcium (Ca), strontium (Sr), zirconium (Zr), and titanium (Ti).

* * * * *